United States Patent
Abraham et al.

(10) Patent No.: US 12,505,308 B2
(45) Date of Patent: Dec. 23, 2025

(54) RESEARCH ACTIVITIES THROUGH CONVERSATIONAL USER EXPERIENCE USING MULTI-MODAL LARGE PRETRAINED MODELS

(71) Applicant: Microsoft Technology Licensing, LLC, Redmond, WA (US)

(72) Inventors: Robin Abraham, Redmond, WA (US); Liang Du, Redmond, WA (US); Fahimeh Raja, Kirkland, WA (US); Wenhan Wang, Bellevue, WA (US); Dustin James Stewart, Woodinville, WA (US); Lipsa Patnaik, Bellevue, WA (US); Stuart Richard Long, Kirkland, WA (US); Timothy Earnheart, Surprise, AZ (US); Sam Daniel Gammon, Alexandria, VA (US); Sacha Arozarena Valladare, Kirkland, WA (US); Jedediah Miller Singer, Washington, DC (US); Henrique Dantas, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 243 days.

(21) Appl. No.: 18/212,838

(22) Filed: Jun. 22, 2023

(65) Prior Publication Data
US 2024/0428008 A1 Dec. 26, 2024

(51) Int. Cl.
*G06F 40/40* (2020.01)
*G06F 16/332* (2025.01)
*G06F 16/3329* (2025.01)

(52) U.S. Cl.
CPC .......... *G06F 40/40* (2020.01); *G06F 16/3328* (2019.01); *G06F 16/3329* (2019.01)

(58) Field of Classification Search
CPC .. G06F 40/40; G06F 16/3328; G06F 16/3329; G06F 16/3344; G06F 40/131; G06F 40/216; G06F 40/30; G06F 40/35
See application file for complete search history.

(56) References Cited

U.S. PATENT DOCUMENTS

2024/0249318 A1* 7/2024 Spiegel .................. H04L 51/02
2024/0281446 A1* 8/2024 Bathwal ................ G06F 16/345

OTHER PUBLICATIONS

Cai et al, Low-code LLM: visual programming over LLMs, https://arxiv.org/abs/2304.08103, Apr. 20, 2023, pp. 1-14 (Year: 2023).*
Ruan et al, TPTU: Task Planning and Tool Usage of Large Language Model-based AI agents, https://arxiv.org/abs/2308.03427, Nov. 7, 2023 (Year: 2023).*

(Continued)

*Primary Examiner* — Linda Wong
(74) *Attorney, Agent, or Firm* — Ray Quinney & Nebeker P.C.; Tiffany B. Healy

(57) ABSTRACT

The present disclosure relates to methods and systems for using large language models to support research activities. The methods and systems include a copilot engine that creates input prompts to provide to the large language model to use in generating responses to input messages. The copilot engine infers an intent of the input messages and sends the intent with the input message in the input prompt to the large language model. The large language model generates different types of responses for different intents.

20 Claims, 14 Drawing Sheets

(56) References Cited

OTHER PUBLICATIONS

Guan et al, Leveraging Pre-Trained Large Language Models to Construct and Utilize World Models for Model-based Task Planning, https://arxiv.org/abs/2305.14909, Nov. 2, 2023 (Year: 2023).*

Jiang et al, Self-Planning Code Generation with Large Language Models, ACM Transactions on Software Engineering and Methodology, vol. 33, No. 7, Article 182, Sep. 2024, pp. 1-30 (Year: 2024).*

Wysocki, Task Planning Model of Software Process, 27th International Conference on Knowledge-Based and Intelligent Information and Engineering Systems, Procedia Computer Science 225 (2023), pp. 736-745 (Year: 2023).*

Gu et al, Plan, Generate and Match: Scientific Workflow Recommendation with Large Language Models, Service Oriented Computing (ICSOC 2023), Nov. 20, 2023, pp. 86-102 (Year: 2023).*

Cai, et al., "Low-code LLM: Visual Programming over LLMs", Retrieved from the URL: https://arxiv.org/pdf/2304.08103v2, Apr. 20, 2023, 14 Pages.

International Search Report and Written Opinion received for PCT Application No. PCT/US2024/034878, Oct. 11, 2024, 12 pages.

Ma, et al., "Query Rewriting for Retrieval-Augmented Large Language Models", in Repository of arXiv:2305.14283v1, May 23, 2023, 8 Pages.

Peng, et al., "Check Your Facts and Try Again: Improving Large Language Models with External Knowledge and Automated Feedback", in Repository arXiv:2302.12813v2, Mar. 1, 2023, 14 pages.

Zhang, et al., "Data-Copilot: Bridging Billions of Data and Humans with Autonomous Workflow", in Repository of arXiv:2306.07209v1, Jun. 12, 2023, 21 Pages.

* cited by examiner

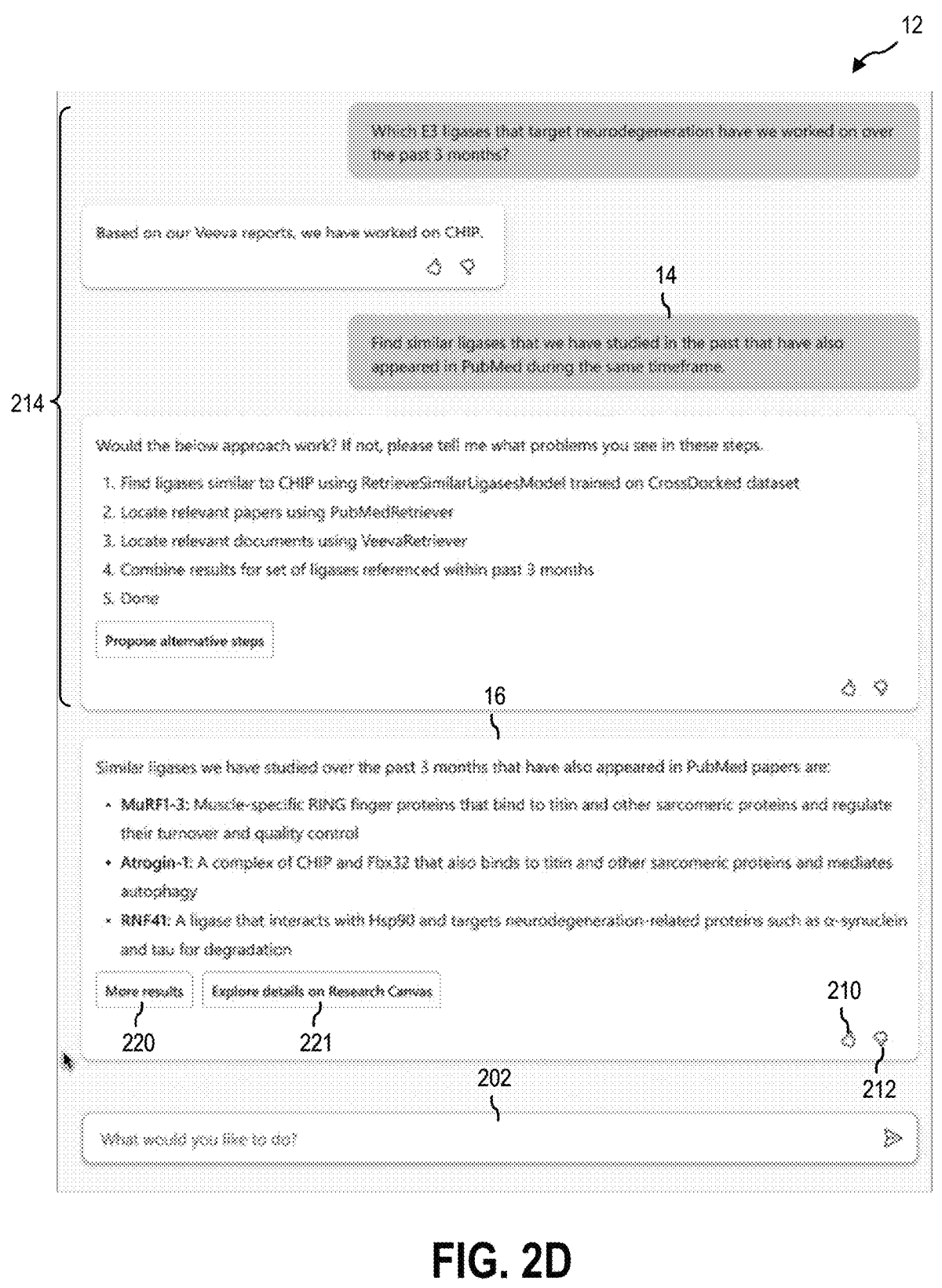

Which E3 ligases that target neurodegeneration have we worked on over the past 3 months?

Based on our Veeva reports, we have worked on CHIP.

Find similar ligases that we have studied in the past that have also appeared in PubMed during the same timeframe.

Would the below approach work? If not, please tell me what problems you see in these steps.

1. Find ligases similar to CHIP using RetrieveSimilarLigasesModel trained on CrossDocked dataset
2. Locate relevant papers using PubMedRetriever
3. Locate relevant documents using VeevaRetriever
4. Combine results for set of ligases referenced within past 3 months
5. Done

[Propose alternative steps]

Similar ligases we have studied over the past 3 months that have also appeared in PubMed papers are:

- MuRF1-3: Muscle-specific RING finger proteins that bind to titin and other sarcomeric proteins and regulate their turnover and quality control
- Atrogin-1: A complex of CHIP and Fbx32 that also binds to titin and other sarcomeric proteins and mediates autophagy
- RNF41: A ligase that interacts with Hsp90 and targets neurodegeneration-related proteins such as α-synuclein and tau for degradation

[More results] [Explore details on Research Canvas]

What would you like to do?

FIG. 2D

Similar ligases we have studied over the past 3 months that have also appeared in PubMed papers are:

- MuRF1-3: Muscle-specific RING finger proteins that bind to titin and other sarcomeric proteins and regulate their turnover and quality control
- Atrogin-1: A complex of CHIP and Fbx32 that also binds to titin and other sarcomeric proteins and mediates autophagy
- RNF41: A ligase that interacts with Hsp90 and targets neurodegeneration-related proteins such as α-synuclein and tau for degradation

[More results] [Explore details on Research Canvas]

14

[Create visualization for grouping similar ligases from above set]

Would the below approach work? If not, please tell me what problems you see in these steps.

1. Compute embeddings for the set of ligases
2. Cluster by similarity score
3. Generate visualization using D3Vix
4. Done

[Explore details on Research Canvas]

16

Visualization has been generated and can be viewed in Copilot mode. Or you can continue explorations here.

[Explore visualization in Copilot mode]

221

202

What would you like to do?

RESEARCH ACTIVITIES THROUGH CONVERSATIONAL USER EXPERIENCE USING MULTI-MODAL LARGE PRETRAINED MODELS

BACKGROUND

Large language models (LLMs) have become increasingly popular due to their ability to generate fluent and coherent text in response to various input prompts. Advancements in LLMs have enabled new products and services, new business models, and efficiencies in business processes across various domains. However, LLM-backed chat applications or services typically support chat sessions that are linear (input-response sequential chains) and are limited to a fixed number of turns. The context of the LLM is limited to the number of tokens the LLM can support. The context the LLM generates outputs for is limited to the prompt that can be provided to the LLM, which can include the user inputs and system responses that have happened before within a given session.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method includes inferring an intent of an input message. The method includes providing, to a large language model, a prompt with the input message and the intent. The method includes receiving, from the large language model, a response with natural language text in response to the input message, wherein different types of responses are provided by the large language model for different intents. The method includes outputting the response.

Some implementations relate to a device. The device includes a processor; memory in electronic communication with the processor; and instructions stored in the memory, the instructions being executable by the processor to: infer an intent of an input message; provide, to a large language model, a prompt with the input message and the intent; receive, from the large language model, a response with natural language text in response to the input message, wherein different types of responses are provided by the large language model for different intents; and output the response.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIGS. 2A-2E illustrate example graphical user interface screens of a chat area of a copilot engine for use with the science platform in accordance with implementations of the present disclosure.

FIGS. 2F and 2G illustrate example graphical user interface screens of a science platform in accordance with implementations of the present disclosure.

FIG. 3C illustrates an example graphical user interface screen with a list of available AI models for use with the science platform in accordance with implementations of the present disclosure.

DETAILED DESCRIPTION

Figure 1:
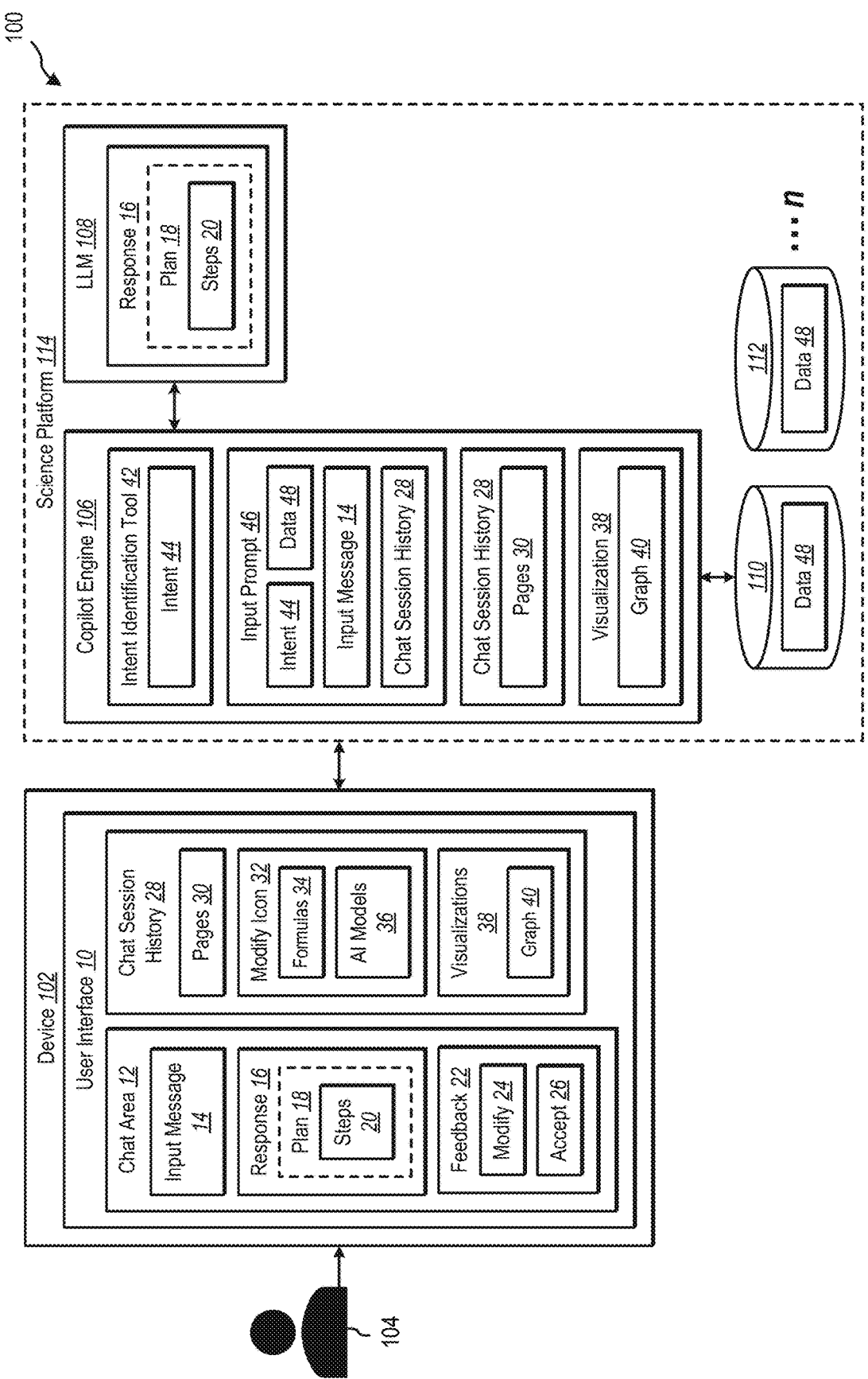
FIG. 1 illustrates an example environment for using a science platform to support research activities in accordance with implementations of the present disclosure.

Large language models (LLMs) have achieved significant advancements in various natural language processing (NLP) tasks. LLMs refer to machine learning artificial intelligence (AI) models that can generate natural language text based on the patterns they learn from processing vast amounts of data. LLMs use deep neural networks, such as transformers, to learn from billions or trillions of words, and to produce text on any topic or domain. LLMs can also perform various NLP tasks, such as classification, summarization, translation, generation, and dialogue.

LLMs have demonstrated a remarkable ability in generating fluent and coherent text in response to various input prompts (e.g., questions or dialog). Advancements in LLMs have enabled new products and services, new business models, and efficiencies in business processes across various domains. One example of new products and services is copilots that help amplify the capabilities of humans performing specific types of tasks. For example, a copilot helps developers work more efficiently by generating code from descriptions, generating documentation, and helping look up functions. Another example includes a copilot allowing users to do multi-turn interactions with a search engine and get results surfaced directly within the chat (with links to sources), thereby saving the users the effort of having to browse multiple links looking for the relevant information.

Another example includes a copilot reducing the manual intervention required in productivity tasks.

However, the copilots being developed are constrained by the capabilities of the underlying large language models (LLMs) themselves. LLM-backed chat applications or services typically support chat sessions that are linear (input-response sequential chains) and are limited to a fixed number of turns. For example, the number of turns in a chat session could be limited to 15 or 20. The context of the LLM is limited to the number of tokens the LLM can support, and the entire session (user inputs and systems responses) needs to be managed within this limitation.

The methods and systems provide an LLM copilot to support research activities that need to go beyond linear chat and current constraints of the LLM models. Research is a uniquely collaborative activity, both within teams and across stages of the end-to-end process, spanning multiple disciplines, teams, areas of expertise, and perspectives. It is important to have the assumptions, thought processes, and insights captured so participants can effectively contribute to enhance the quality of the output while also mitigating any potential risks.

Research is critical to enterprises' long-term survival and success. It is vital to leverage past learnings, both within the organization and across the domain, to accelerate current efforts. For example, in Pharma, thousands of molecules get studied before one or two make it to the market as medicines. However, the knowledge from all the leverage this knowledge given advances for retargeting, better management of side molecules that have been studied remains locked up within lab notebooks, experiment reports, and regulatory filings. There is tremendous value unlocked in being able to effects, changes in regulations, and improvements in manufacturing processes.

In research activities there is also the need to keep up with the ever-changing and fragmented regulatory landscape across different countries and governments. For example, it might be easier to get approval for a new medicine in one country versus another, and the aspects that determine the outcome could be influenced by factors varying from laws in effect at a given point in time to severity, spread or prevalence of a disease within a specific population or country.

In research activities it is very important to manage the compliance risks and costs effectively while maintaining innovation agility and speed. There is also the opportunity to leverage technology to even automate many of the compliance processes and to monitor regulatory changes, effectively mining the new laws and announcements to feed back the insights and impact to enable activities within an enterprise to adapt to evolving realities and prioritize investments and focus accordingly.

Given that most of these industries (for example, Energy, Pharma, and Material Sciences) are highly regulated, it is essential to be able to provide a complete audit trail of all inferences and activities, making it easier to trace the source of any issues and also answer any regulatory inquiries. Traceability also makes it easier for multiple human experts, with their own knowledge and points of view, to examine the chain of reasoning and identify potential risks and implement controls as needed to mitigate those risks, thereby reducing the likelihood of non-compliance and legal issues around negligence.

Effective research happens when knowledge and creativity come together. Information retrieval questions can be pretty deep and facilitated by an LLM model or chat experience supporting research activities. However, the overall research activity tends to be bushy. Examples of how research activities tend to be bushy include: there are multiple hypotheses or avenues that researchers try to explore; researchers might go back to some idea or path of reasoning that was shelved before; researchers want to maintain context across these paths and be able to move between them; abandon dead-end reasoning paths and prune; researchers need to be able to see emerging patterns: two temporally distant paths of reasoning might converge to a common path, idea/opportunity, or conclusion; researchers might need to share parts of their reasoning with colleagues to get their feedback or contributions; researchers need to archive chunks of reasoning as lessons learnt, or for filing for approval with regulatory agencies where researchers need to show your work (and not just the final result); and researchers might want to reuse specific threads of reasoning as knowledge, best practices, or processes for accomplishing a goal. These flows could then be used as building blocks for other researchers within the organization.

Research activities need support beyond linear evolution of chat over limited context. A researcher is not following a specification and does not start or resume a research activity with a set of questions that lead to a desired outcome after a set number of turns.

The present disclosure includes several practical applications that provide benefits and/or solve problems associated with using LLMs to support research activities. The methods and systems amplify the capabilities of LLMs in the case of business processes and workflows that have a lot of branching, involve multiple participants, and need to support examination and auditing of work.

The methods and systems provide a science platform to support research activities. The science platform helps users explore new ideas for research, develop products or solutions during the research process, and test the products or solutions. The science platform integrates a plurality of sources of data, a copilot engine to support research activities using one or more LLMs that generates responses to the input messages. In some implementations, a single LLM is used to generate responses to the input message. In some implementations, a plurality of LLMs are used to generate responses to the input messages.

The copilot engine receives the input messages for the LLM from the users and infers an intent of an input message. The copilot engine generates an input prompt with the intent for the LLM to use in generating a response to the input message. The copilot engine also provides the data to the LLM to use in generating a response to the input message. The LLM generates different types of responses for different intents. For example, if the intent is a multistep query, the LLM generates a response with a plan with steps for responding to the multistep query. The user may edit or modify the plan. Upon the user selecting the plan, the LLM generates a response to the input message using the plan. Another example includes if the intent is a scientific question, the LLM generates an answer to the scientific question. The answer may include links to the data source providing the answer, as well as summary and reasoning on how the retrieved information leads to the conclusion. The answer may also include visualizations or other representations of the data providing the answer. The co-pilot engine preprocesses and transforms the query, retrieves relevant document or data from available data sources, and generates answer to the scientific question.

One technical advantage of the methods and systems of the present disclosure is using an LLM to determine an intent of the input message and providing the intent as part of the input prompt to an LLM to use in generating different types of responses for different intents of the input message. In some implementations, the methods and systems of the present disclosure generate the response directly, either from the LLM or using the knowledge representations available to the copilot engine, to serve the user intent. Another technical advantage of the methods and systems of the present disclosure is receiving a plan with a plurality of steps from the LLM for responding to multistep queries, or intents that require multiple steps to fulfil, in the input message. Another technical advantage of the methods and systems of the present disclosure is allowing modifications of the plan, interactively through chat, for responding to multistep queries prior to receiving a response from an LLM for an input message. Another technical advantage of the methods and systems of the present disclosure is providing long running chat sessions (which users can also resume in the future) with LLMs without limits on session length.

Referring now to FIG. 1, illustrated is an example environment 100 for use with a science platform 114 that provides support for research activities. The science platform 114 integrates data sources 110, 112 up to n (where n is a positive integer) of data 48 for use with the science platform 114, and a copilot engine 106 to support interactions with an LLM 108. The co-pilot engine 106 preprocesses and transforms the input messages 14 received from the user 104, retrieves relevant document or data from available data sources, and generates answers to the input messages 14. The copilot engine 106 generates responses 16 to the input messages 14 directly, either from the LLM 108 or using the knowledge representations available to the copilot engine 106, to serve the user intent. In some implementations, the copilot engine 106 uses a single LLM 108 to generates the responses 16 to the input messages 14. In some implementations, the copilot engine 106 uses a plurality of LLMs 108 to generate the responses 16 to the input messages 14. Examples of the LLM 108 include GPT-3, GPT-4, BERT, XLNET, AND ELEUTHERAI. The science platform 114 provides end-to-end support for research activities. The science platform 114 includes a large collection of AI models 36 (from a service provider of the science platform 114 and created by users 104 of the science platform 114) and functions from the built-in programming language that are leveraged by the science platform 114 to support research flows of the users 104. For example, the users 104 access the science platform 114 to explore new ideas for research using the LLM 108, develop products or solutions using the LLM 108, and test the products or solutions using the LLM 108. The science platform 114 provides a centralized location for supporting the research processes.

The science platform 114 is accessible to a user 104 using a user interface 10 on a device 102 of the user 104. In some implementations, a plurality of devices 102 are in communication with the science platform 114 and a plurality of users 104 have access to the science platform 114.

In some implementations, the science platform 114 is on a server (e.g., a cloud server) remote from the device 102 of the user 104 accessed via a network. The network may include the Internet or other data link that enables transport of electronic data between respective devices and/or components of the environment 100. For example, a uniform resource locator (URL) configured to an end point of the science platform 114 is provided to the device 102 for accessing the science platform 114 and communicating with the science platform 114. In some implementations, the science platform 114 is local to the device 102 of the user 104.

The user interface 10 is presented on a display of the device 102 and the user interface 10 includes a chat area 12 that the user 104 uses to provide input messages 14 to the copilot engine 106 of the science platform 114 and start a chat session with the LLM 108. In some implementations, the input message 14 provided by the user 104 starts the chat session with the LLM 108. In some implementations, the LLM 108 engages with the user 104 by sending the user 104 a proactive message (e.g., a message "Can I help you?") to start the chat session with the LLM 108. The input message 14 includes natural language text. The input message 14 can be natural language sentences, questions, code snippets or commands, or any combination of text or code, depending on the domain and the task. One example input message 14 is a question or query. Another example input message 14 is a sentence. Another example input message 14 is a portion of a conversation or dialog. In some implementations, the input message 14 includes a multistep query. In some implementations, the input messages 14 includes a query to create a formula to run a science model or a query to execute a data operation. In some implementations, the input messages 14 includes a query for a scientific term or seeking an answer to a scientific question. In some implementations, the input messages 14 include a query for help or support using the copilot engine 106.

The copilot engine 106 receives the input message 14 and uses an intent identification tool 42 to infer an intent 44 of the input message 14. The copilot engine 106 defines a set of intents, and the intent identification tool 42 leverages an LLM to determine the intent of any user's input messages 14. The intent identification tool 42 uses an LLM to process the natural language of the input message 14 to infer the intent 44 of the input message 14. The intent identification tool 42 dynamically constructs a prompt with the user's 104 input message 14, messages from previous chat history, and other conversational context information. Few-shots samples are injected into the prompt to provide examples to let the LLM infer the intent accordingly. The user's 104 input message 14 is wrapped in the prompt and sent to the LLM. The prompt provides contexts for all the capabilities/ intents that are supported by the system, and the LLM returns the best match given the user input message 14. If there is no match, the user's 104 input message 14 is answered by the LLM itself. A default intent is used when the LLM does not find the best match, and a prompt is used to let the LLM respond with clarification questions to the user's 104 input message 14.

One example of the intent 44 includes a multistep plan for a query. Examples of a multistep plan include building a data flow for a query in the input message 14 or executing a data operation for the input message 14. Another example of the intent 44 is seeking an answer for a scientific query in the input message 14. Another example of the intent 44 is asking for help or support for using the copilot engine 106. Another example of the intent 44 is an ambiguous intent. An ambiguous intent occurs when the intent identification tool 42 is unable to determine an intent 44 for the input message 14.

The copilot engine 106 provides an input prompt 46 with the intent 44 and the input message 14 to the LLM 108. The input prompts 46 are the inputs or queries that a user or a program gives to the LLM 108, in order to elicit a specific response from the LLM 108 in response to the input prompt 46. The LLM 108 uses the intent 44 in generating a response 16 to the input message 14.

The copilot engine 106 also provides data 48 to the LLM 108 for use in generating the response 16 to the input message 14. The copilot engine 106 accesses the data sources 110, 112 of data 48 in the science platform 114 and provides the data 48 to the LLM 108.

In some implementations, the data 48 is publicly available information from publicly available data sources 110, 112. Examples of publicly available data sources include scientific journals, scientific documents, patent filings, publications, news, earnings reports, company information, knowledge graphs, mapping information, photographs, biomedical information, clinical data, administrative information, regulations, or geographic data.

In some implementations, the data 48 is private information unavailable to the public. An example of private information includes organizational data unavailable to the public, such as, research notes, lab documents, business processes, manufacturing processes, trade secrets, and/or experimental data. Another example of private information is prebuilt indexes, such as, search indexes, embeddings for a domain, and/or knowledge graphs for a domain. Another example of private information is AI models 36 created by an organization for use with the copilot engine 106. For example, users, such as a data scientist for an organization, may onboard AI models 36 for use with the copilot engine 106. The AI models 36 ingest the data 48 and provides a knowledge representation of the data 48 (e.g., embeddings, graphs, performs functions on the data 48, etc.). The users provide a description of the AI model 36 and the input parameters for the AI model 36 when onboarding the AI models 36 to the science platform 114. The AI models 36 are accessible by end users 104 within the organizational subscription and are accessible by the copilot engine 106 to provide to the LLM 108 for use in responding to the input message 14 for the organizational subscription. The organization may have custom AI models 36 for use with the organization that are unavailable to third parties outside of the organization also using the copilot engine 106.

In some implementations, the data 48 includes a combination of publicly available information and private information unavailable to the public. For example, the data source 110 has data 48 from a publicly available data index and the data source 112 has data 48 from a private company.

In some implementations, the data 48 includes REXL language specifications, manuals, and examples. The data 48 provides prompt examples to the LLM 108 for answering flow building or data operation queries and helping the LLM 108 generate formulas.

In some implementations, the data 48 includes model descriptions and examples. The data 48 provides descriptions or examples of models and functions for the LLM 108 to decide which AI models 36 to use in generating formulas for answering flow building or data operations queries and helping the LLM 108 generate formulas.

In some implementations, the data 48 includes user manual information and frequently asked questions for using the copilot engine 106. The data 48 provides prompt examples to the LLM 108 for answering how-to questions, help questions, or support questions received in the input messages 14.

The LLM 108 uses the intent 44 and the data 48 in generating the response 16 for the input message 14. Different types of responses 16 are generated by the LLM 108 for different types of intents 44.

One type of response 16 generated by the LLM 108 is a plan 18 with steps 20 for a multistep plan for answering a query in the input message 14. Each step 20 of the plan 18 includes explicit representation of that step's inputs and outputs allowing the LLM 108 to reason over a potential plan and identify whether the steps could flow from one to the next (i.e., whether a later step's input needs are satisfied by the outputs of previous steps and by any other information or resources available to the planner, which the LLM 108 also knows about). If necessary, the LLM 108 revises the plan 18 to address any gaps that the LLM 108 identifies. For example, if the intent 44 is inferred as a multistep plan for a query in the input message 14, the LLM 108 generates a plan 18 identifying steps 20 the LLM 108 is going to use for answering the query. Another example includes if the intent 44 is inferred as building a data flow for a query in the input message 14 or executing a data operation for the input message 14, the LLM 108 generates a plan 18 identifying the steps 20 the LLM 108 is going to use to obtain the data 48 to build the data flow or execute the data operation.

The LLM 108 breaks the query of the input message 14 into a plurality of steps 20. The plan 18 includes the steps 20 in an order. Each step 20 in the plan 18 provides an explanation for a purpose of the step 20. For example, the step 20 includes an explanation of any data sources 110, 112 the LLM 108 is going to use to obtain the data 48, any AI models 36 the LLM 108 is going to use on the data 48 to provide a knowledge representation of the data 48, and/or any functions the LLM 108 is going to use on the data 48. Functions are an expression or rule that defines a relation from a set of inputs to a set of outputs. For example, a function is a data operation. An example function includes a SORT (Table, Column) function that takes a table and column within the table as input, and returns the table sorted by values in the specified column. Functions are a useful construct to facilitate both data operations, such as SORT (Table, Colum), as well as AI Models AI models are trained to recognize certain types of patterns and generate an output based on the training. AI models detect patterns in input data and can generate outputs for inputs they have not been trained on. AI models, by design, can be represented as functions because the AI models take some input data and produce an output based on their training. The AI models 36 onboarded to the science platform 114 are also available to the user 104 as functions.

In some implementations, the steps 20 indicate that the LLM 108 is going to use a combination of data sources 110, 112 for the data 48. In some implementations, the steps 20 indicate that the LLM 108 is going to use a combination of AI models 36 and functions together on the data 48. For example, the step 20 includes a reasoning chain of the AI models 36 and/or the functions placed in a sequence of use.

In some implementations, the LLM 108 uses a combination of direct instruction and few shot learning to write formulas for each of the steps 20 in a language (REXL) that it has not been trained on. The formulas are provided to a formula verification skill in the copilot engine 106. The formula verification skill binds the formula according to the workspace changes (e.g., changes in the chat session history 28) kept along with the flow builder, tries to parse, and bind the formula, and returns whether the formula is correct. If the formula is incorrect, it returns the error message, indicating which errors it has, and provides some hint to the LLM 108 for correcting the formula. If the formulas are correct, the formulas are provided in one or more steps 20.

Another type of response 16 generated by the LLM 108 is an answer to a scientific question in the input message 14. For example, if the intent 44 is inferred as asking a scientific question, the LLM 108 uses the data 48 provided by the copilot engine 106 to generate a response 16 with an answer to the scientific question. In some implementations, the response 16 contains a link to the file or the data source 110, 112 that provided the information for the answer, as well as reasoning on how the retrieved information leads to the conclusion in the response 16. For example, the user 104 can click on the link and read the scientific journal or document where the answer was obtained from by the LLM 108. In some implementations, the response 16 provides reasoning on how the data 48 retrieved by the LLM 108 answers the user's 104 question.

In some implementations, copilot engine 106 uses an LLM tool to rewrite the query from the input message 14 into different alternatives to assist in retrieving the most relevant data from the different data sources 110, 112. Rewriting the query also helps in identifying which data sources 110, 112 to use for the query (e.g., prebuilt libraries and/or indexes for the domain of the query). The rewritten input message and/or any additional information about the data sources 110, 112 is provided to the LLM 108 to use in generating the response 16 with the answer to the scientific question. In some implementations, a plurality of relevant results (e.g., 5 to 20 relevant results) are obtained from the data 48 by the LLM 108 for the response 16. The LLM 108 ranks the relevant results and provides a summarization for each relevant result with reasoning on how the relevant results support answering the user's 104 questions. In some implementations, each relevant result includes a link to the data source 110, 112 that provided the data 48 for the answer included in the response 16. The user 104 may click the link to see the information that provided the answer. In some implementations, the copilot engine 106 uses an LLM tool to reduce or eliminate hallucinations from the relevant results provided by the LLM 108.

Another type of response is an answer to a question. For example, if the intent 44 is asking for help or support for using the copilot engine 106, the LLM 108 provides an answer to the question provided in the input message 14. One example question for asking for help using the copilot engine 106 is "how to extract tables and figures from a PDF document using the copilot engine 106?" The data 48 provided by the copilot engine 106 with the input prompt 46 to the LLM 108 includes relevant examples retrieved from the user manual by the copilot engine 106 based on semantic embedding. The LLM 108 uses the data 48 and the intent 44 to provide a response 16 with an answer to the question.

Another type of response is asking questions to the user 104 for clarification. For example, if the intent 44 is ambiguous, the LLM 108 provides a response 16 with a question asking for further clarification from the user 104. Another type of response is a statement that the question cannot be answered. For example, if the intent 44 is ambiguous, the LLM 108 provides a response 16 indicating that the question cannot be answered.

The response 16 is provided by the copilot engine 106 for presentation on the user interface 10 in response to the input message 14. In some implementations, the user interface 10 provides icons for the user 104 to provide feedback 22 for the response 16.

One example of the feedback 22 is a modify icon 24 for modifying the response 16. For example, the user 104 modifies the reasoning chains provided in a step 20 of the plan 18 by adding AI models 36 or formulas to the reasoning chain in the step 20. Another example includes the user 104 or removing AI models 36 or formulas from the reasoning chain in the step 20. Another example includes the user 104 modifies the reasoning chains provided in a step 20 of the plan 18 by placing the AI models 36 or formulas in a different order. Another example includes the user 104 modifies the plan 18 by proposing alternate steps 20 to the plan 18. Another example includes the user 104 modifies the plan 18 by removing one or more steps 20 from the plan 18. Another example includes the user 104 selecting a different data source 110, 112 for the step 20. Any changes provided by the user 104 to the plan 18 are captured in the chat session history 28.

Another example of the feedback 22 is an icon asking for a new plan. For example, the user 104 selects the icon to ask the copilot engine 106 for a new plan 18 from the LLM 108.

Another example of the feedback 22 is an accept icon 26 for accepting the response 16. The response 16 becomes part of the chat session history 28 in response to the user 104 accepting the response 16.

In some implementations, the user interface 10 includes an icon that the user 104 selects to provide a visualization 38 of the response 16. In some implementations, the user 104 asks to see a visualization of a previous response 16 using the input message 14. The copilot engine 106 prepares the visualization 38 of the response 16 in response to the user selecting the icon or asking to see a visualization in the input message 14. In some implementations, the visualization 38 is a graph 40 illustrating the data 48 in the response 16. The user 104 may use the visualization 38 to identify connections among the data 48 or identify groupings of the data 48. The user 104 may use the visualization 38 to easily ingest the data 48 provided in the response 16.

The user interface 10 may have an icon the user 104 may select to present the chat session history 28. The chat session history 28 includes the previous responses 16 generated by the LLM 108. In some implementations, the chat session history 28 includes pages 30. The pages 30 correspond to the previous responses 16 generated by the LLM 108. In some implementations, the pages 30 correspond to the plans 18 that the LLM 108 provided in the responses 16. One example includes one page 30 corresponding to one step 20 of a plan 18. Another example includes one page 30 corresponding to a plurality of steps 20 of a plan 18. Another example includes one page 30 corresponding to all steps 20 of a plan 18. Another example includes a plurality of pages 30 corresponding to one step 20 of a plan 18.

The chat session history 28 allows the user 104 to see the input messages 14 and the responses 16 generated by LLM 108. The chat session history 28 also allows the user 104 to inspect each step 20 of a plan 18 generated by the LLM 108 and the supporting information for each step 20 of the plan 18 or the response 16. For example, the user 104 opens a page 30 for a step 20 and the AI models 36 or formulas 34 are identified for the step 20 along with any reasoning provided by the LLM 108 for selecting the AI models 36 or formulas 34. Another example includes the user 104 opens up a page 30 for a response 16 and a link is provided to the data source 110, 112 that the LLM 108 used to answer a question in the input message 14, as well as a summary with reasoning on how the retrieved information leads to the conclusion in the response 16.

In some implementations, the chat session history 28 includes a modify icon 32 that allows the user 104 to modify the pages 30 of the chat session history 28. For example, the user 104 adds pages 30 to the chat session history 28. Another example includes the user 104 removes pages 30 from the chat session history 28. Another example includes the user 104 edits pages 30 from the chat session history 28. Another example includes the user 104 adds AI models 36 to the pages 30. Another example includes the user 104 adds formulas 34 to the pages 30. Another example includes the user 104 removing AI models 36 or formulas 34 from the pages 30.

The user 104 may use the chat session history 28 to trace the conversation with the LLM 108 and verify the work of the LLM 108. The chat session history 28 allows the user 104 to inspect the pages 30 and modify the pages 30 on the fly in near real time. The chat session history 28 maintains the state of the session with the LLM 108 and allows the session to continue with the LLM 108. The chat session history 28 allows the session to continue with the copilot engine 106 over a period of time without having to restart the conversation. As the user 104 provides new input messages 14 to the copilot engine 106 and the responses 16 are received from the LLM 108, new pages 30 are added to the chat session history 28 allowing the chat session to continue with the LLM 108 without adding limits to a number of turns or context to the chat session.

In some implementations, the user 104 has different sessions with the copilot engine 106 for different projects the user 104 is working on. For example, the user 104 has one session with the copilot engine 106 to ask questions about building a new molecule and a different session with the copilot engine 106 to ask questions about side effects of a drug. Each session has an individual chat session history 28 that maintains the state of each chat session with the copilot engine 106. The user 104 may switch between the sessions and use the chat session history 28 for the session to remember what input messages 14 have been sent to the copilot engine 106 and what responses 16 have been provided by the LLM 108 in response to the input messages 14. For example, the user 104 returns to a session after months of working on a different project and the chat session history 28 is maintained for the session and the user 104 is able to continue asking the LLM 108 questions where the user 104 left off and the LLM 108 uses the information stored in the chat session history 28 in providing responses 16 to the user 104.

As the LLM 108 provides response 16 to the input messages 14, the input prompt 46 to the LLM 108 also includes the chat session history 28 and the LLM 108 uses the intent 44, the data 48, and the chat session history 28 in generating the response 16 for the input message 14. Any changes made by the user 104 to the plan 18 or the pages 30 of the chat history 28 are stored in the chat session history 28 and are used by the LLM 108 in providing future responses 16 to the input messages 14.

The science platform 114 aids the user in research activities by providing a central location to support research activities, manage research activities, and/or track research activities over time.

In some implementations, one or more computing devices (e.g., servers and/or devices) are used to perform the processing of the environment 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the user interface 10 and the science platform 114 are implemented wholly on the same computing device. Another example includes one or more subcomponents of the user interface 10 and/or the science platform 114 (the copilot engine 106, LLM 108, and/or the data sources 110, 112) are implemented across multiple computing devices. Moreover, in some implementations, one or more subcomponent of the user interface 10 and/or the science platform 114 (the copilot engine 106, LLM 108, and/or the data sources 110, 112) may be implemented are processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

Figure 2A:
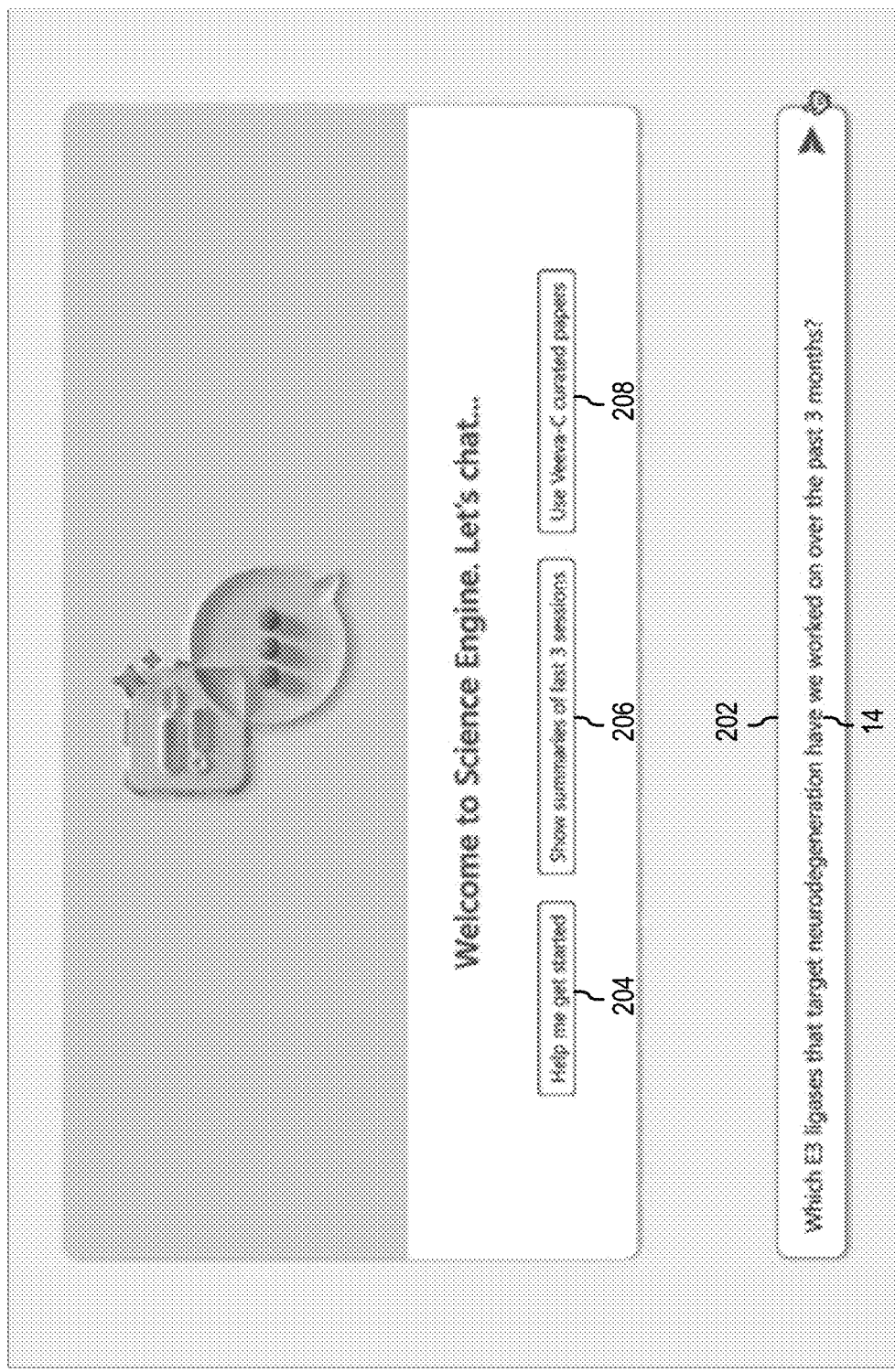

FIG. 2A, illustrates an example graphical user interface (GUI) screen of a chat area 12 of the copilot engine 106 (FIG. 1). The chat area 12 is displayed using the user interface 10 (FIG. 1) of the device 102 (FIG. 1). The chat area 12 may be displayed in response to the user 104 (FIG. 1) accessing the science platform 114 (FIG. 1). The chat area 12 includes icons 204, 206, 208 that the user 104 may select to start a research project.

The chat area 12 also includes an input box 202 that allows the user 104 to provide an input message 14 to an LLM 108 (FIG. 1). For example, the user 104 enters in the question "which E3 ligases that target neurodegeneration have we worked on over the past 3 months?" The copilot engine 106 receives the input message 14 and determines the intent 44 (FIG. 1) of the input message 14 is asking a question. The copilot engine 106 creates an input prompt 46 (FIG. 1) with the intent 44, the input message 14, and the data 48 (FIG. 1) to provide to the LLM 108.

Figure 2B:
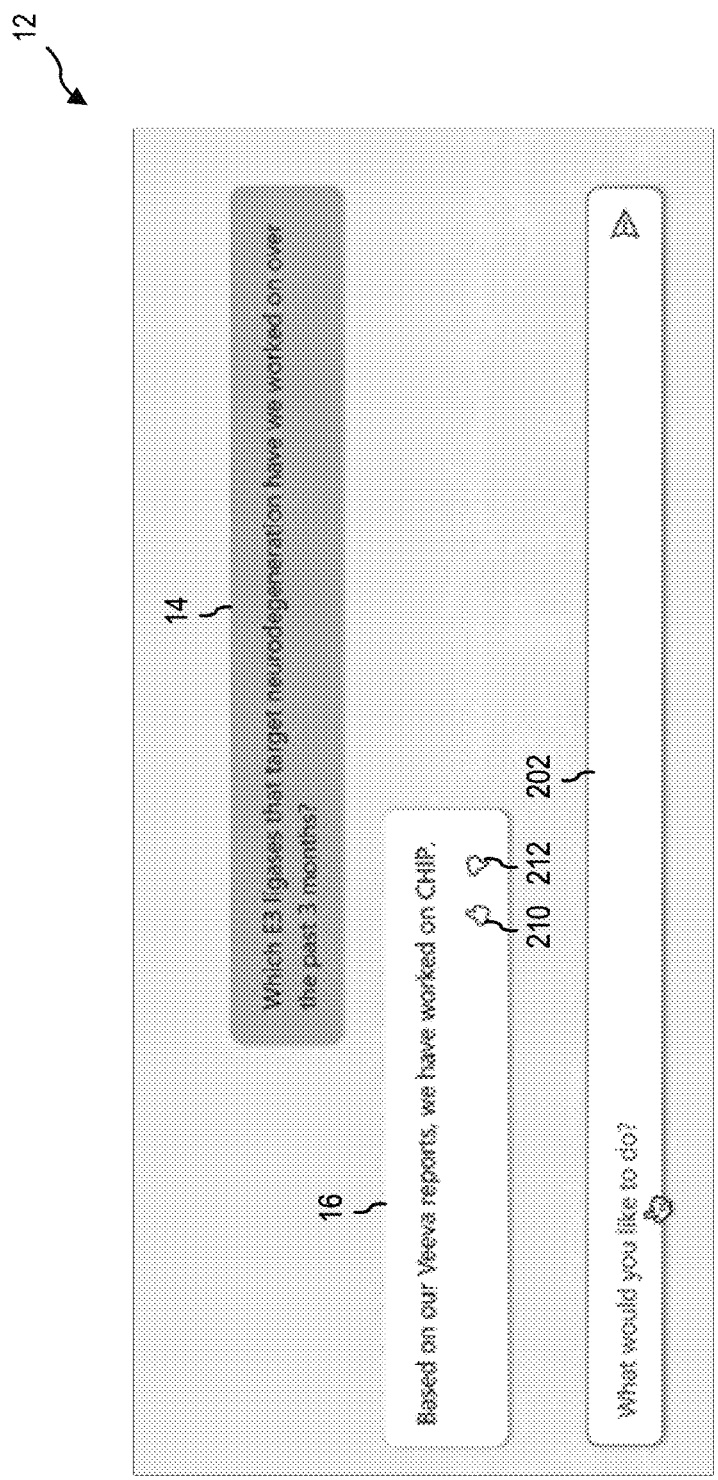

FIG. 2B illustrates an example GUI screen of the chat area 12 of the copilot engine 106 with a response 16 from the LLM 108 to the input message 14. For example, the response 16 includes the natural language "based on our Veeva reports, we have worked on CHIP." The LLM 108 uses the intent 44 and the data 48 provided by the copilot engine 106 to generate the response 16 to the input message 14.

The chat area 12 displays icons 210 and 212 that the user 104 may click to provide feedback 22 (FIG. 1) for the response 16. For example, the icon 210 is a thumbs up that the user 104 selects to provide positive feedback for the response 16 and the icon 212 is a thumbs down that the user 104 selects to provide negative feedback for the response 16. The feedback provided by the user 104 is used by the LLM 108 in generating future responses 16. The user 104 may enter in a new input message 14 in the input box 202.

Figure 2C:
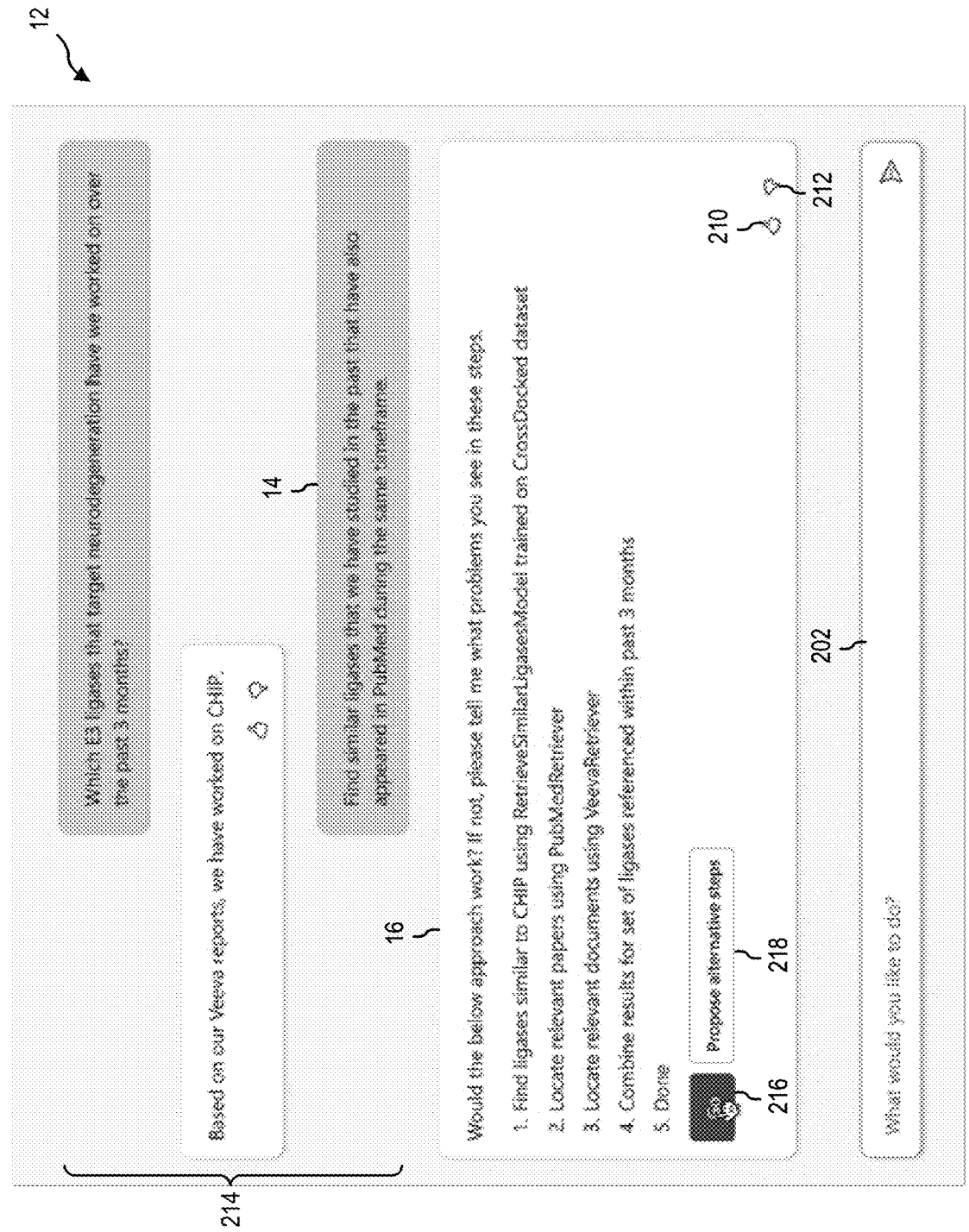

FIG. 2C illustrates an example GUI screen of the chat area 12 of the copilot engine 106 with a message history area 214 with the previous input message and responses in the chat session (e.g., the input messages and responses from FIGS. 2A and 2B). The message history area 214 also includes the most recent input message 14 "find similar ligases that we have studied in the past that have also appeared in PubMed during the same timeframe" provided by the user 104. The copilot engine 106 (FIG. 1) receives the input message 14 and determines that the intent 44 (FIG. 1) of the input message 14 is a multistep query, or an intent 44 that requires multiple steps to fulfil. The copilot engine 106 creates an input prompt 46 (FIG. 1) with the intent 44, the input message 14, and the data 48 (FIG. 1) to provide to the LLM 108 (FIG. 1).

The LLM 108 uses the intent 44 and the data 48 provided by the copilot engine 106 to generate the response 16 with a plan 18 (FIG. 1) for answering the query in the input message 14. The plan 18 includes a plurality of steps 20 (steps 1 through 5) for answering the input message 14. Each step 20 includes a description of the step and the data sources 110, 112 the LLM 108 is going to use for generating the response 16. The chat area 12 includes an icon 216 for accepting the plan 18 and an icon 218 for requesting alternative steps for the plan 18. The user 104 may make modifications to the plan 18 interactively using the chat area 12. The chat area 12 also includes displays icons 210 and 212 that the user 104 may click to provide feedback 22 (FIG. 1) for the response 16. The user 104 may explore the plan 18 further by selecting the icons 216, 218 or the user 104 may enter in a new input message 14 in the input box 202. Selection of the icon 216 by the user 104 triggers execution of the plan 18 by the LLM 108. Selection of the icon 218 by the user 104 triggers the LLM 108 to propose alternate steps 20 for the plan 18.

FIG. 2D illustrates an example GUI screen of the chat area 12 of the copilot engine 106 with a message history area 214 with the previous input message and responses in the chat session. The chat area 12 includes a response 16 provided by the LLM 108 (FIG. 1) in response to the user 104 (FIG. 1) selecting the icon 216 to accept the plan 18 (FIG. 1) provided by the LLM 108. The response 16 includes three answers to the input message 14. Each of the answers provides an explanation of the answer. The chat area 12 also includes display icons 210 and 212 that the user 104 may click to provide feedback 22 (FIG. 1) for the response 16. The user 104 may enter in a new input message 14 in the input box 202.

The chat area 12 includes an icon 220 that the user 104 may select to view more results. If the user 104 selects the icon 220, the LLM 108 provides additional answers in the response 16. For example, the LLM 108 provides lower ranked answers in response to the user 104 selecting to view more results. The chat area 12 also includes an icon 221 that allows the user 104 to explore more details in a canvas view of the science platform 114.

FIG. 2E illustrates an example GUI screen of the chat area 12 of the copilot engine 106 with a message history area 214 with the previous input message and responses in the chat session. The chat area 12 includes a response 16 with language indicating that a visualization (e.g., the visualization 38 (FIG. 1)) has been created in response to the latest input message 14. The user 104 may select an icon 221 to explore the visualization in a copilot mode in a canvas view of the science platform 114 or may continue to explore the visualization by inputting a new input message 14 in the input box 202.

Figure 2F:
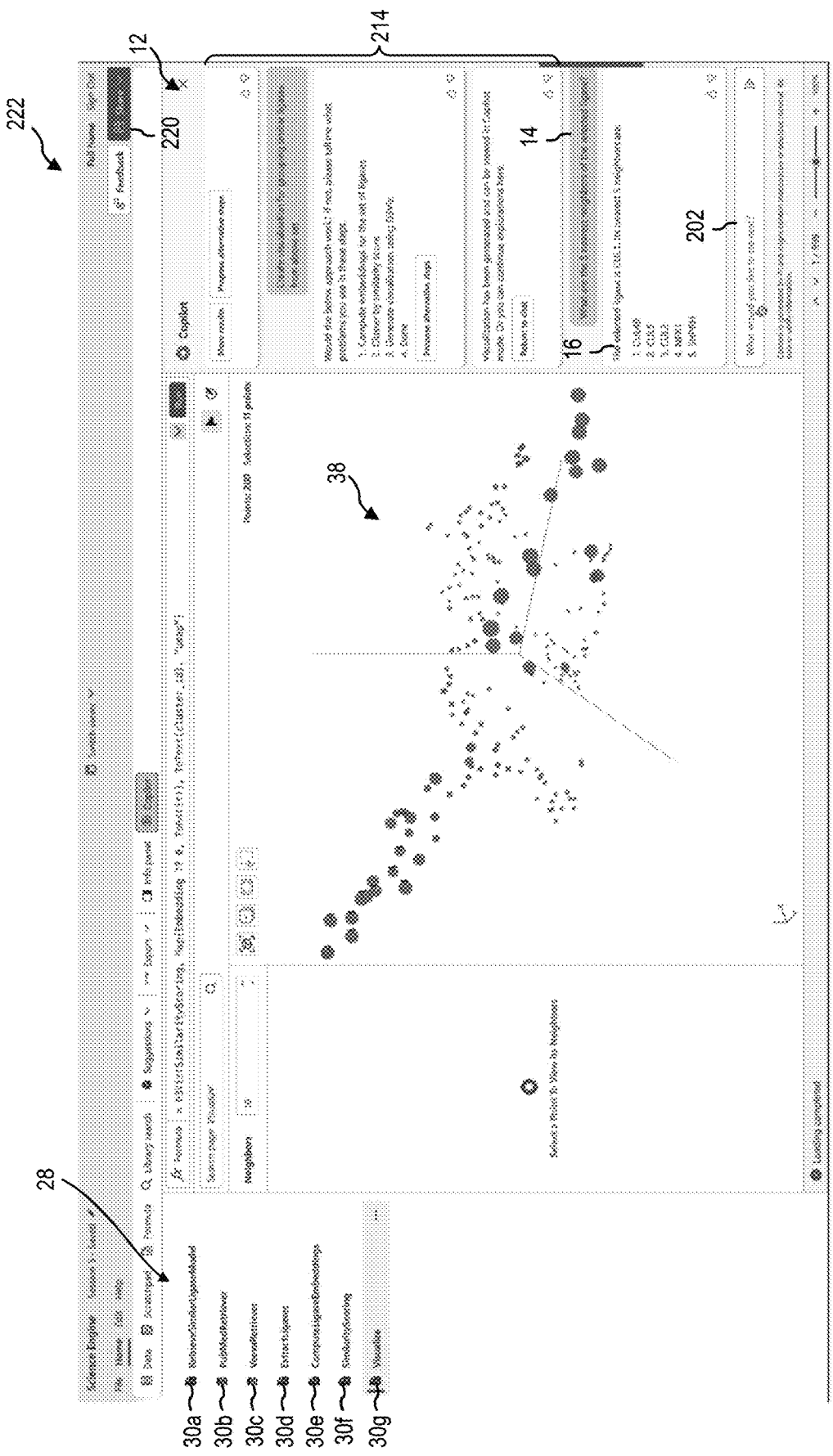

FIG. 2F illustrates an example GUI screen 222 of the science platform 114. The GUI screen 222 may be presented in response to the user selecting the icon 216 (FIG. 2E) to explore the visualization. The GUI screen 222 includes the chat area 12, the visualization 38, and the chat session history 28. The visualization 38 is generated by the LLM 108 (FIG. 1) in response to the input message 14 requesting a visualization.

The user 104 may use the visualization 38 to ingest the data 48 easier. For example, the user 104 may select items in the visualization 38 to obtain additional information. The user 104 may also use the visualization 38 to ask additional questions to the LLM 108. For example, the user 104 selects items in the visualization 38 and asks follow up questions to the LLM 108 for the selected items.

The chat area 12 includes a message history area 214 with the previous input message and responses in the chat session. The user 104 may continue the chat session by adding a new input message 14 based on interactions with the visualization 38. For example, the new input message 14 includes "what are the 5 nearest neighbors of the selected ligase?" The LLM 108 uses the visualization 38 to provide the answer to the input message 14. The user 104 may use the input box 202 to continue asking questions with new input messages 14.

The chat session history 28 includes the pages 30 (e.g., page 30*a*, page 30*b*, page 30*c*, page 30*d*, page 30*e*, page 30*f*, page 30*g*) that correspond to the different responses 16 that the LLM 108 has provided to the input messages 14. As the user 104 provides input messages 14 to the copilot engine 106 and receives the responses 16 from the LLM 108, new pages 30 are added to the chat session history 28 that correspond to the input messages 14 and the responses 16 allowing the chat session to continue with the LLM 108 without adding limits to a number of turns or context to the chat session.

The user 104 may select any of the pages 30 and see the information provided by the LLM 108. The pages 30 allow the user 104 to easily navigate through the chat session history 28 and provide information supporting different responses 16 provided by the LLM 108. The pages 30 may be used by the user 104 for traceability or auditing of the chat session. The pages 30 provide information supporting the conclusions or answers provided in the chat session by the LLM 108. If the user 104 makes any changes to the pages 30, the changes are updated in the chat session history 28 and used by the LLM 108 in provided future responses 16 to input messages 14.

The GUI screen 222 also includes an icon 220 that the user 104 may select to share information from the chat session with other users. For example, the user 104 shares a response 16 provided by the LLM 108 to other users. Another example includes the user 104 shares the information from one or more pages 30 with other users. Another example includes the user 104 shares a visualization 38 created by the LLM 108 with other users.

The GUI screen 222 provides the user 104 with a central location for interacting with the chat area 12, viewing any visualizations 38 generated for the data 48 (FIG. 1), and the chat session history 28.

Figure 2G:
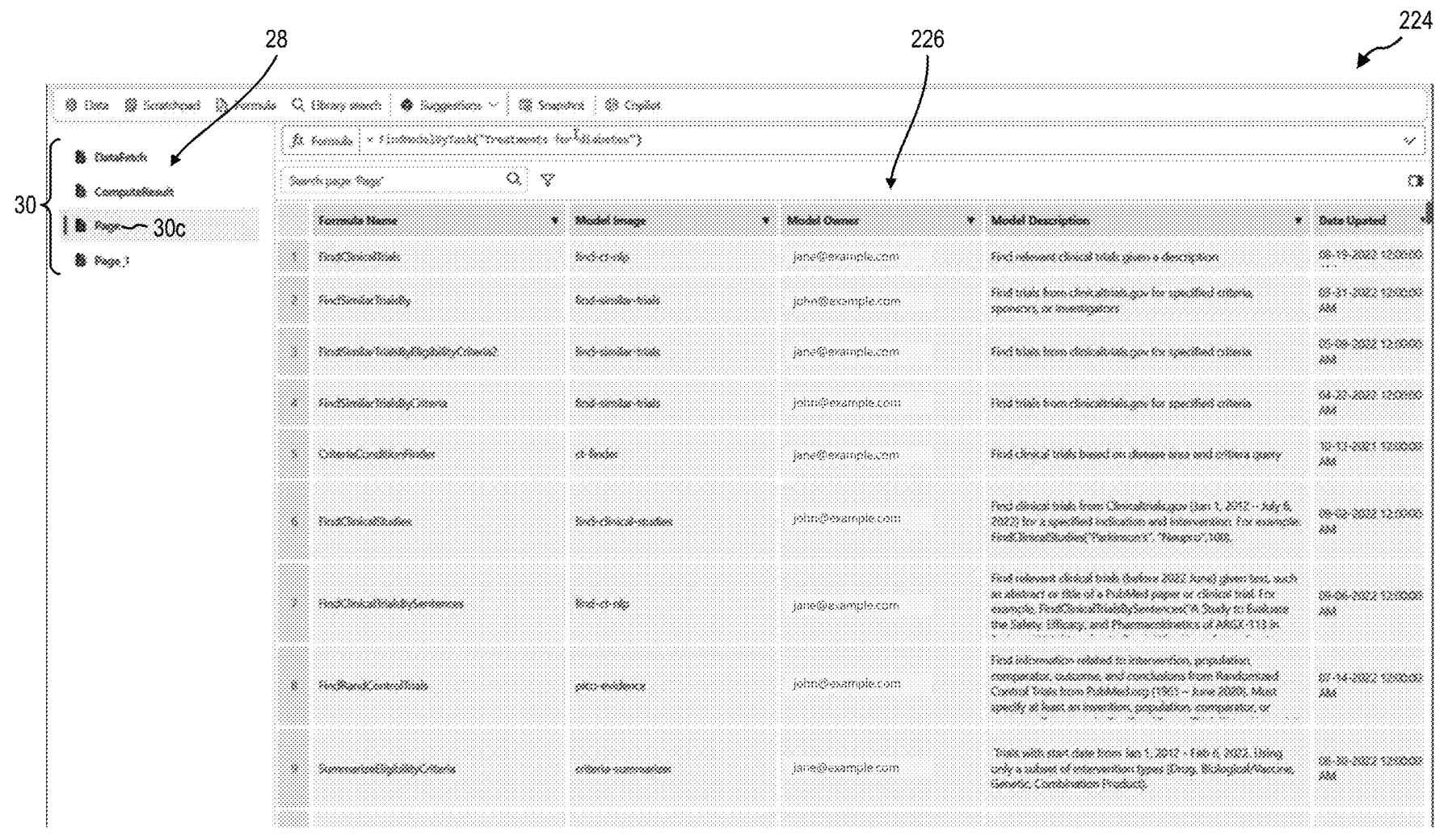

FIG. 2G illustrates an example GUI screen 224 of the science platform 114. The GUI screen 224 includes the chat session history 28 with a plurality of pages 30. The pages 30 correspond to formulas 34 and AI model 36 invocations that were automatically generated by the system (either steps 20 or plans 18) based on different input messages 14 and responses 16 provided by the LLM 108 (FIG. 1) for the chat session with the LLM 108. The information 226 presented on the GUI screen 224 is for the selected page 30*c*. For example, the information 226 provides additional details on the AI models 36 (FIG. 1) used in the response 16 corresponding to the page 30*c*. The user 104 may use the information 226 for auditing a validity of the responses 16 provided by the LLM 108. In addition, the user 104 may use the information 226 in tracing the chat session history 28. The user 104 may also use the information 226 in providing support for the responses 16.

The user 104 may use the GUI screen 224 to modify the information 226 (e.g., add or remove AI models 36, or edit the formulas 34 (FIG. 1) or AI models 36) for the pages 30. In addition, the user 104 may use the GUI screen 224 to add or remove pages 30 from the chat session history 28. Any edits made by the user 104 to the pages 30 in the chat session history 28 may be used by the LLM 108 in providing future responses 16 to input messages 14.

The user 104 may use the GUI screen 224 to easily navigate between different pages 30 in the chat session history 28 and obtain the information 226 corresponding to the different pages 30.

Figure 3A:
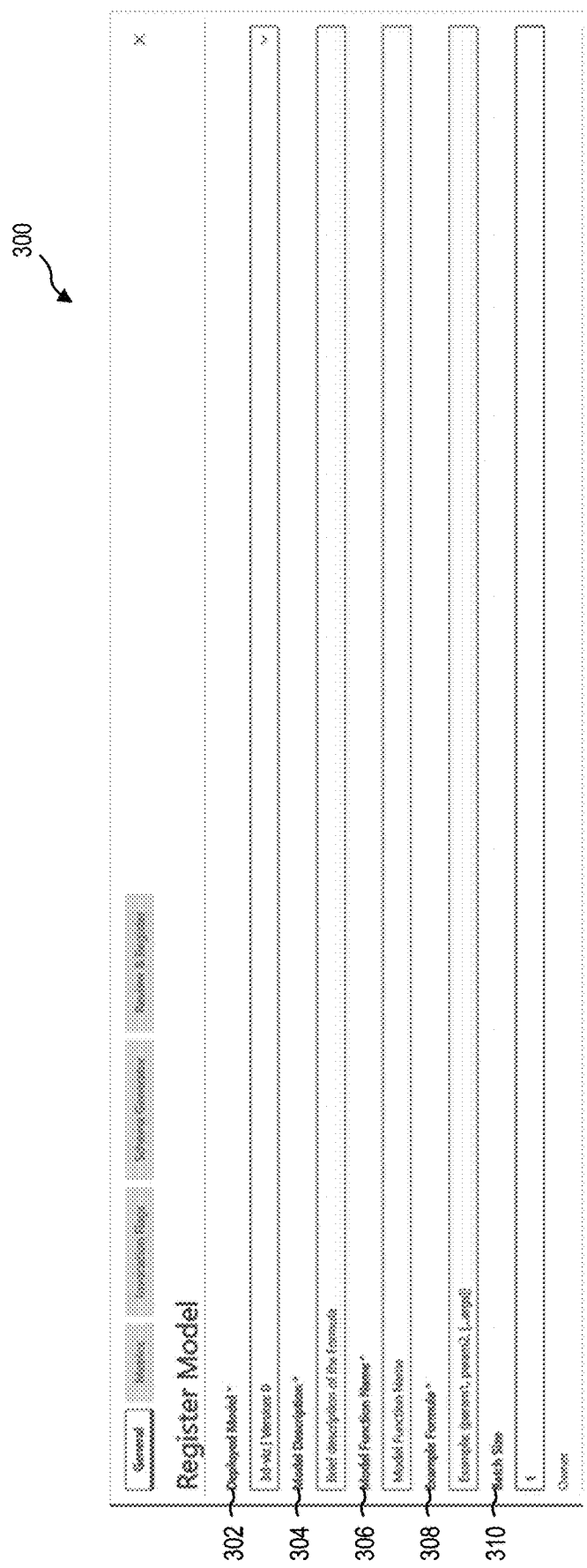
FIG. 3A illustrates an example graphical user interface screen of registering an AI model for use with the science platform in accordance with implementations of the present disclosure.

FIG. 3A illustrates an example GUI 300 for registering an AI model 36 (FIG. 1) for use with the science platform 114 (FIG. 1). The GUI 200 is displayed on the user interface 10 (FIG. 1) of the device 102 (FIG. 1) of the user 104 (FIG. 1). For example, a user 104, such as a data scientist for an organization, may onboard AI models 36 for use with the science platform 114. The user 104 provides the deployed model name 302, the model description 304, the input parameters to the model, the model function name 306, an example formula 308 used by the model, a batch size 310, and a model owner during the registration process for the AI model 36. The registration process for the AI model 36 captures metadata for the AI model 36 and the co-pilot engine 106 (FIG. 1) uses the metadata for the AI model 36 in determining whether to use the AI model 36 in responding to the user's 104 input message 14.

In some implementations, the AI model 36 is a custom AI model 36 for an organization. For example, the AI model 36 is built for use by the organization. The AI models 36 are accessible by end users 104 within the organizational subscription for use with the science platform 114. The organization may have custom AI models 36 for use with the organization that are unavailable to third parties outside of the organization also using the science platform 114. For example, the copilot engine 106 may use the AI models 36 onboarded to the science platform 114 by the organization for responding to the user's 104 input messages 14 within the organization subscription. The science platform 114 includes a large collection of AI models 36 (from a service provider of the science platform 114 and created by the users 104 of the science platform 114) and functions from the built-in programming language that are leveraged by the science platform 114 to support research flows of the users 104.

Figure 3B:
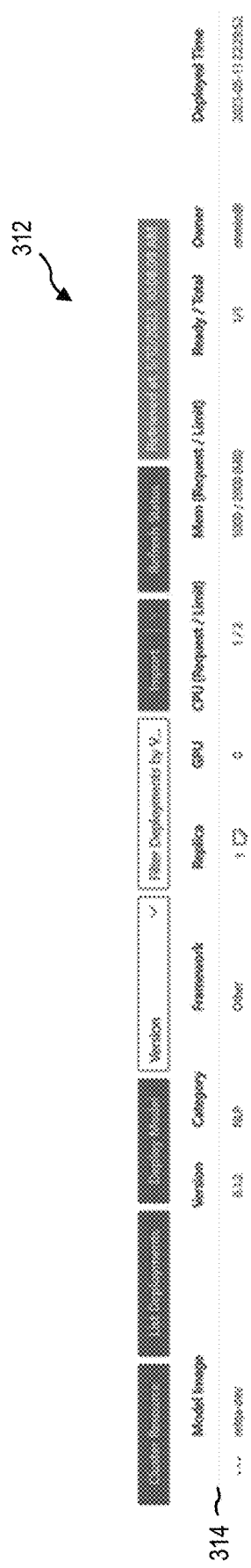
FIG. 3B illustrates an example graphical user interface screen with AI model information in accordance with implementations of the present disclosure.

FIG. 3B illustrates an example GUI 312 with AI model information 314 for an AI model 36 (FIG. 1) onboarded to the science platform 114. The GUI 312 is displayed on the user interface 10 (FIG. 1) of the device 102 (FIG. 1) of the user 104 (FIG. 1). The AI model information 314 may be used to identify system requirements for the AI model 36 (e.g., GPU or CPU usage requirements for the AI model 36). The AI model information 314 may also be used to trace which user 104 created the AI model 36.

Figure 3C:
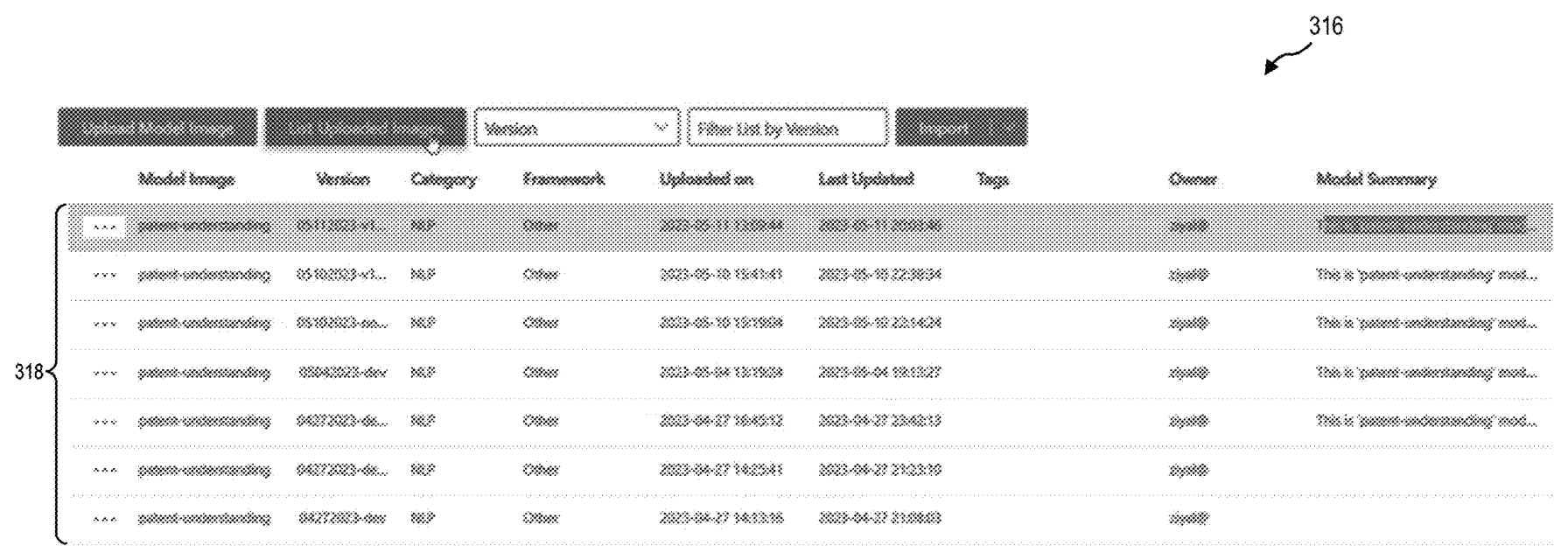

FIG. 3C illustrates an example GUI 316 with a list 318 of available AI models 36 (FIG. 1) for use with the science platform 114 (FIG. 1). The GUI 316 is displayed on the user interface 10 (FIG. 1) of the device 102 (FIG. 1) of the user 104 (FIG. 1). The list 318 of AI models 36 includes the model information 314 (FIG. 3B) for each of the AI models 36. The AI model information 314 may be used to explain the parameters for the AI model 36 and the functions the AI model 36 performs. The copilot engine 106 may use the model information 314 to identify which AI models 36 in the list 318 of available AI models to use in responding to the user's 104 input messages 14.

In some implementations, the list 318 of available AI models 36 includes custom AI models for use within the user's 104 subscription to the science platform 114. In some implementations, the list 318 of available AI models 36 includes AI models provided by a service provider of the science platform 114 and available for use by all users of the science platform 114. In some implementations, the list 318 of available AI models 36 includes a combination of custom AI models available for use within the user's 104 subscription to the science platform 114 and public AI models available to all users of the science platform 114.

Figure 3D:
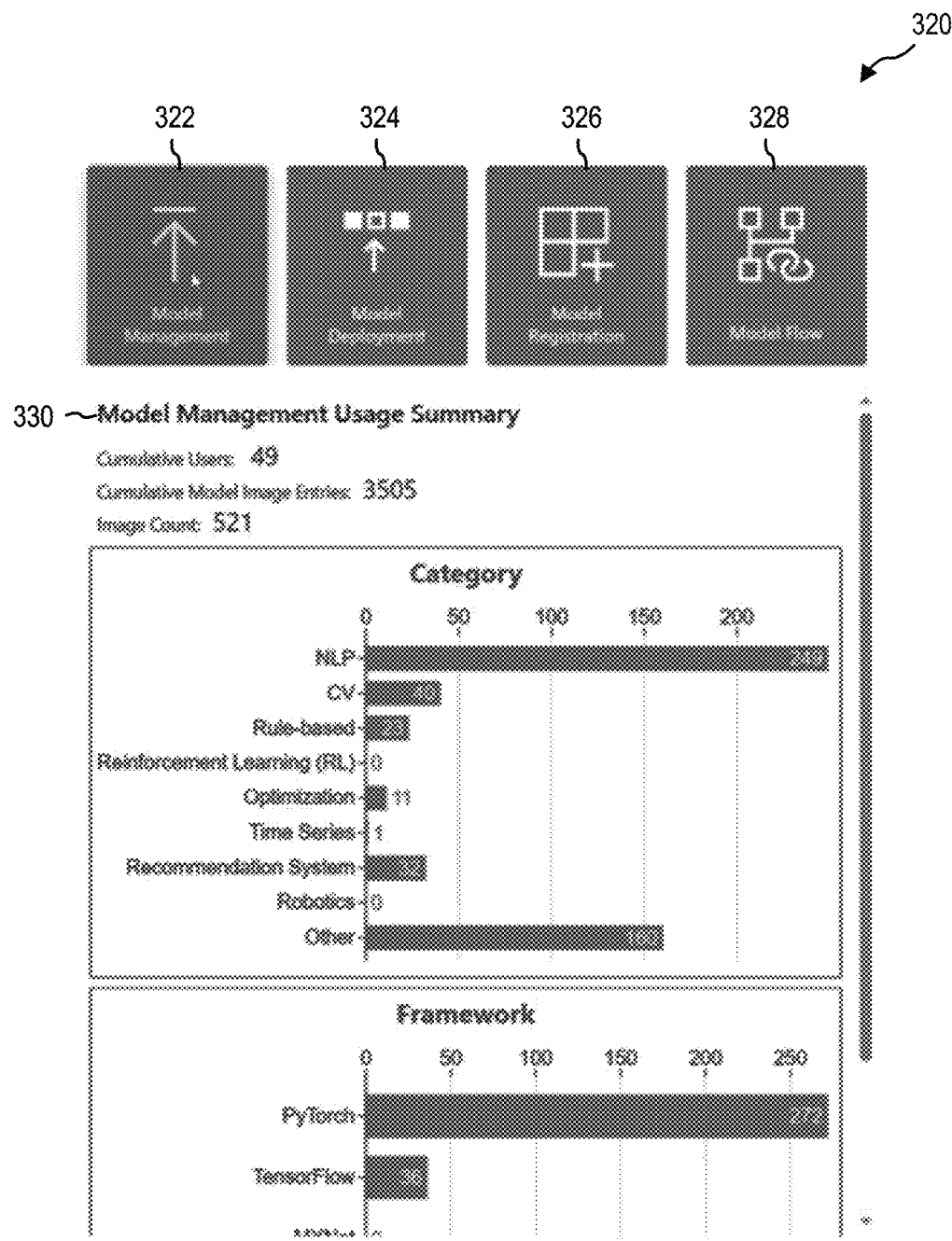
FIG. 3D illustrates an example graphical user interface screen for AI model management in accordance with implementations of the present disclosure.

FIG. 3D illustrates an example GUI 320 for AI model management to manage the AI models 36 (FIG. 1) for use with the science platform 114 (FIG. 1). The GUI 320 is displayed on the user interface 10 (FIG. 1) of the device 102 (FIG. 1) of the user 104 (FIG. 1). The user 104 selects the icon 322 to manage the AI models 36 registered with the science platform 114. For example, the model management usage summary 330 is presented in response to the user 104 selecting the icon 322. The user 104 selects the icon 324 to deploy the AI models 36 into the science platform 114. The user 104 selects the icon 326 for registering a new AI model 36 with the science platform 114. For example, the GUI 300 (FIG. 3A) is displayed in response to the user 104 selecting the icon 326 and the user 104 may enter in the model information for the new AI model 36. The user 104 selects the icon 328 to view the AI model flows for the AI models 36 registered with the science platform 114. The GUI 320 aids the user 104 in managing the AI models 36 onboarded for use with the science platform 114 and adding new AI models 36 for use with the AI platform 114.

Figure 4:
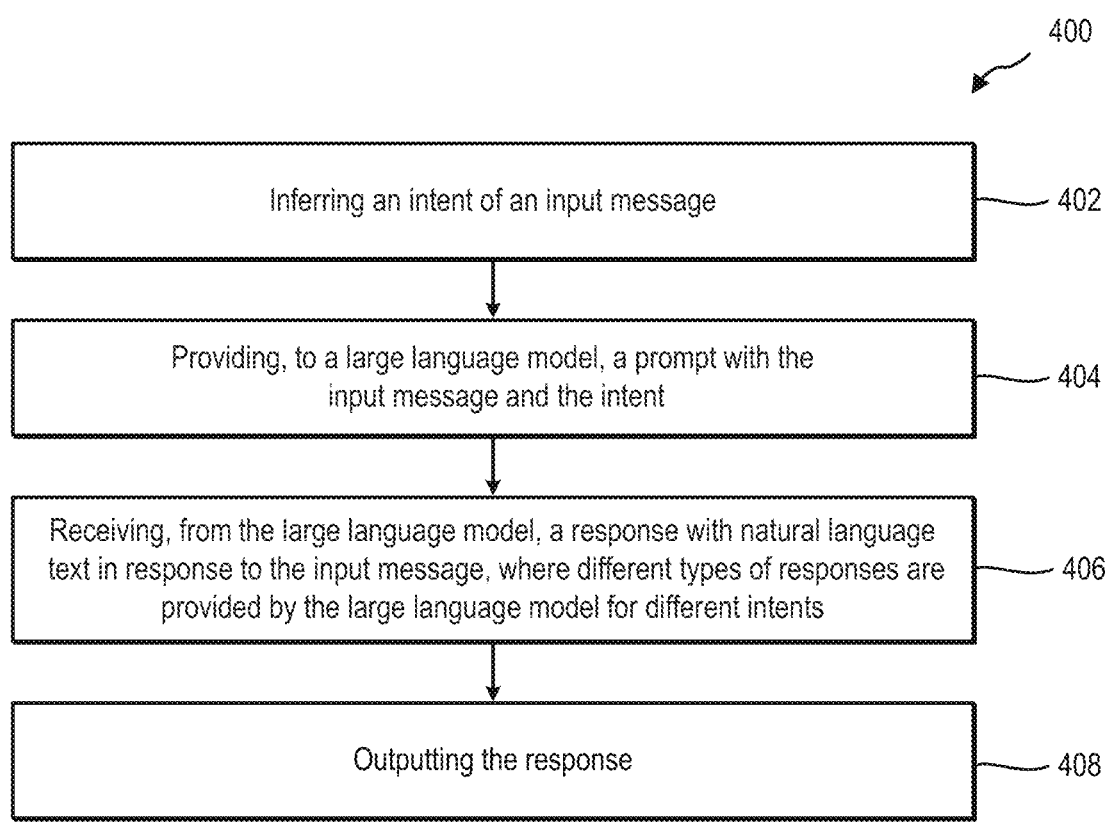
FIG. 4 illustrates an example method for using an LLM for research activities in accordance with implementations of the present disclosure.

FIG. 4 illustrates a method for using an LLM for research activities. The actions of the method 400 are discussed below with reference to FIGS. 1-2F.

At 402, the method 400 includes inferring an intent of an input message. The copilot engine 106 receives the input message 14 and uses an intent identification tool 42 to infer an intent 44 of the input message 14. The intent identification tool 42 analyzes the natural language of the input message 14 to determine the intent 44. In some implementations, the intent identification tool 42 uses an LLM to process the natural language of the input message 14 to infer the intent 44 of the input message 14.

At 404, the method 400 includes providing, to an LLM, a prompt with the input message and the intent. The copilot engine 106 provides an input prompt 46 with the intent 44 and the input message 14 to the LLM 108. The input prompts 46 are the inputs or queries that a user or a program gives to the LLM 108, in order to elicit a specific response from the LLM 108 in response to the input prompt 46. The LLM 108 uses the intent 44 in generating a response 16 to the input message 14.

The copilot engine 106 also provide data 48 to the LLM 108 for use in generating the response 16 to the input message 14. The copilot engine 106 accesses the data sources 110, 112 of data 48 in the science platform 114 and provides the data 48 to the LLM 108. In some implementations, the data sources 110, 112 are publicly available data sources 110, 112 with publicly available data 48. In some implementations, the data sources 110, 112 are private data sources 110, 112 with private data 48 unavailable to the public. One example of private data is organizational data unavailable to the public. Another example of private data is custom AI models 36. For example, a data scientist creates custom AI models 36 for use with an organization. The LLM 108 uses the data 48 and the intent 44 in generating responses 16 for the input messages 14.

At 406, the method 400 includes receiving, from the LLM, a response with natural language text in response to the input message. The LLM 108 provides different types of responses 16 for different intents 44.

In some implementations, the intent 44 is a multistep plan for a query in the input message 14 and the type of response 16 provided by the LLM 108 is a plan with steps for the multistep plan. For example, the multistep plan is to build a data flow or execute a data operation. The LLM 108 breaks the query in the input message 14 into a plurality of steps 20; generates the plan 18 with the steps 20 for the multistep plan; and outputs the response 16 with the plan 18 and an explanation for each step 20. In some implementations, the steps 20 include a combination of AI models 36 and formulas 34 to generate a reasoning chain for the steps 20 of the plan 18.

In some implementations, the intent 44 is seeking an answer for a scientific query in the input message 14 and the type of response provided by the LLM 108 is an answer to the scientific query. The LLM 108 retrieves relevant data based on a relevance score from a grounded dataset for answering the scientific query. For example, the grounded dataset includes publicly available data sources 110, 112 and private data sources 110, 112 accessible by the science platform 114. The LLM 108 outputs the response 16 with the relevant data with reference links identifying a source of the relevant data, as well as summary and reasoning on how the retrieved information leads to the conclusion. In some implementations, the LLM 108 ranks the relevant data in an order and provides a top portion of the relevant data in the response 16.

In some implementations, the intent 44 is asking a support question and the type of response 16 provided by the LLM 108 is an answer to the support question with information obtained from a user manual or support guide for providing the answer.

At 408, the method 400 includes outputting the response. The response 16 is provided by the copilot engine 106 for presentation on the user interface 10 of a device 102 of the user 104 in response to the input message 14. In some implementations, the user interface 10 provides icons for the user 104 to provide feedback 22 for the response 16.

In some implementations, the copilot engine 106 receives feedback 22 for the plan 18 with a modification to the plan 18. For example, the user 104 provides the feedback 22 to the plan 18 using the user interface 10. Examples of modifications include a removal of an AI model 36 or formula 34, an addition of an AI model 36 or formula 34, a removal of a step 20, an addition of a step 20, selecting a different data source 110, 112 for the plan 18, or editing a step 20. The LLM 108 incorporates the feedback 22 into the response 16 and the response 16 includes the modifications to the plan 18.

In some implementations, the copilot engine 106 receives approval for the plan 18. The copilot engine 106 creates, in response to the approval for the plan 18, pages 30 corresponding to the different steps 20 in the plan 18. The copilot engine 106 stores in a chat session history 28 the pages 30. The pages 30 provide information for the plan 18.

The chat session history 28 allows the user 104 to see the input messages 14 and the responses 16 generated by LLM 108. The chat session history 28 also allows the user 104 to inspect each step 20 of a plan 18 generated by the LLM 108 and the supporting information for each step 20 of the plan 18 or the response 16. For example, the user 104 opens a page 30 for a step 20 and the AI models 36 or formulas 34 are identified for the step 20 along with any reasoning provided by the LLM 108 for selecting the AI models 36 or formulas 34. Another example includes the user 104 opens up a page 30 for a response 16 and a link is provided to the data source 110, 112 that the LLM 108 used to answer a question in the input message 14, along with reasoning on how the retrieved information leads to the conclusion in the response 16.

In some implementations, the copilot engine 106 receives an additional page 30 with a formula 34 or AI model 36 and adds the page 30 to the chat session history 28. For example, the user 104 uses the user interface 10 to create a new page 30 with AI models 36 and the copilot engine 106 adds the new page 30 to the chat session history 28. The LLM 108 uses the chat session history 28 in combination with the intent 44 in preparing the response 16 to subsequent input messages 14.

In some implementations, the copilot engine 106 creates a page 30 corresponding to the response 16. The page 30 provides information for the response 16. The copilot engine 106 stores the page 30 in a chat session history 28 and the LLM 108 uses the chat session history 28 in combination with the intent 44 in preparing responses 16 to subsequent input messages 14.

The method 400 supports the user 104 in research activities using the LLM 108.

Figure 5:
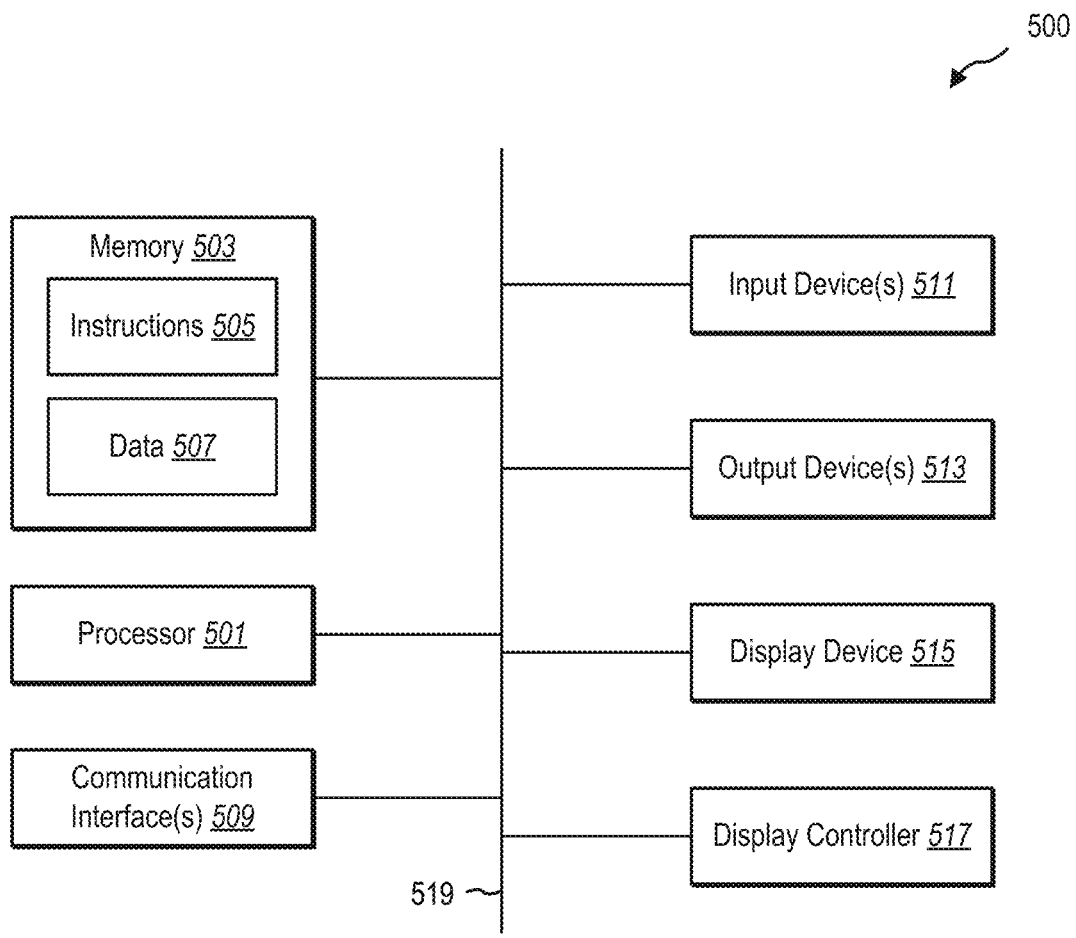
FIG. 5 illustrates components that may be included within a computer system.

FIG. 5 illustrates components that may be included within a computer system 500. One or more computer systems 500 may be used to implement the various methods, devices, components, and/or systems described herein.

The computer system 500 includes a processor 501. The processor 501 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 501 may be referred to as a central processing unit (CPU). Although just a single processor 501 is shown in the computer system 500 of FIG. 5, in an alternative configuration, a combination of processors (e.g., an ARM and DSP) could be used.

The computer system 500 also includes memory 503 in electronic communication with the processor 501. The memory 503 may be any electronic component capable of storing electronic information. For example, the memory 503 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 505 and data 507 may be stored in the memory 503. The instructions 505 may be executable by the processor 501 to implement some or all of the functionality disclosed herein. Executing the instructions 505 may involve the use of the data 507 that is stored in the memory 503. Any of the various examples of modules and components described herein may be implemented, partially or wholly, as instructions 505 stored in memory 503 and executed by the processor 501. Any of the various examples of data described herein may be among the data 507 that is stored in memory 503 and used during execution of the instructions 505 by the processor 501.

A computer system 500 may also include one or more communication interfaces 509 for communicating with other electronic devices. The communication interface(s) 509 may be based on wired communication technology, wireless communication technology, or both. Some examples of communication interfaces 509 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 500 may also include one or more input devices 511 and one or more output devices 513. Some examples of input devices 511 include a keyboard, mouse, microphone, remote control device, button, joystick, trackball, touchpad, and lightpen. Some examples of output devices 513 include a speaker and a printer. One specific type of output device that is typically included in a computer system 500 is a display device 515. Display devices 515 used with embodiments disclosed herein may utilize any suitable image projection technology, such as liquid crystal display (LCD), light-emitting diode (LED), gas plasma, electroluminescence, or the like. A display controller 517 may also be provided, for converting data 507 stored in the memory 503 into text, graphics, and/or moving images (as appropriate) shown on the display device 515.

In some implementations, the various components of the computer system 500 are implemented as one device. For example, the various components of the computer system 500 are implemented in a mobile phone or tablet. Another example includes the various components of the computer system 500 implemented in a personal computer.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a clustering model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated implementations of the present disclosure. A stated value should therefore be interpreted broadly enough to encompass values that are at least close enough to the stated value to value, as would be appreciated by one of ordinary skill in the art encompassed by perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
inferring an intent of an input message that starts a chat session with a large language model;
providing, to the large language model, a prompt with the input message and the intent;
selecting, by the large language model, artificial intelligence (AI) models from a list of available AI models based on the intent of the input message using model information that identifies parameters of the AI models and functions the AI models perform;
receiving, from the large language model, a response with a plan with natural language text in response to the input message, wherein different types of responses are provided by the large language model for different intents and the plan includes a plurality of steps where each step includes a reasoning chain with a description of the AI models selected for use by the large language model for each step;
outputting the response;
receiving a modification to the reasoning chain adding an AI model to the AI models for a step in the plan; and
executing, by the large language model, the plan using the AI models, wherein the AI models ingest data and provide knowledge representations of the data.

2. The method of claim 1, wherein the intent is a multistep plan for a query in the input message and the type of response provided by the large language model is a plan with steps for the multistep plan.

3. The method of claim 2, wherein the multistep plan is to build a data flow or execute a data operation.

4. The method of claim 2, wherein the large language model:
breaks the query in the input message into the steps;
generates the plan with the steps for the multistep plan; and
outputs the response with the plan and an explanation for each step.

5. The method of claim 4, wherein the large language model uses a combination of artificial intelligence (AI) models and formulas to generate a reasoning chain for the steps of the plan.

6. The method of claim 5, further comprising:
receiving feedback for the plan with a modification to the plan, wherein the modification is a removal of an AI model or formula, an addition of a formula, a removal of a step, an addition of a step, selecting a different data source for the plan, or editing a step.

7. The method of claim 6, wherein the response includes the modification to the plan.

8. The method of claim 4, further comprising:
receiving approval for the plan;
creating, in response to approval for the plan, pages corresponding to the steps in the plan; and
storing, in a chat session history, the pages, wherein the pages provide information for the plan.

9. The method of claim 8, further comprising:
receiving an additional page with a formula or AI model; and
adding the additional page to the chat session history.

10. The method of claim 8, wherein the large language model uses the chat session history in combination with the intent in preparing the response to subsequent input messages.

11. The method of claim 1, wherein the intent is seeking an answer for a scientific query in the input message and the type of response provided by the large language model is an answer to the scientific query.

12. The method of claim 11, wherein the large language model:
retrieves relevant data based on a relevance score from a grounded dataset for answering the scientific query; and
outputs the response with the relevant data with reference links identifying a source of the relevant data.

13. The method of claim 12, wherein the large language model ranks the relevant data in an order and provides a top portion of the relevant data in the response.

14. The method of claim 12, wherein the grounded dataset includes publicly available data sources and private data sources.

15. The method of claim 1, wherein the intent is asking a support question and the type of response provided by the large language model is an answer to the support question with information obtained from a user manual or support guide for providing the answer.

16. The method of claim 1, further comprising:
creating a page corresponding to the response, wherein the page provides information for the response; and
storing, in a chat session history, the page, wherein the large language model uses the chat session history in combination with the intent in preparing the response to subsequent input messages.

17. A device, comprising:
a memory to store data and instructions; and
a processor operable to communicate with the memory, wherein the processor is operable to:
infer an intent of an input message that starts a chat session with a large language model;
provide, to the large language model, a prompt with the input message and the intent;
select, by the large language model, artificial intelligence (AI) models from a list of available AI models based on the intent of the input message using model information that identifies parameters of the AI models and functions the AI models perform;
receive, from the large language model, a response with a plan with natural language text in response to the input message, wherein different types of responses are provided by the large language model for different intents and the plan includes a plurality of steps where each step includes a reasoning chain with a description of the AI models selected for use by the large language model for each step;

output the response;

receive a modification to the reasoning chain adding an AI model to the AI models for a step in the plan; and execute, by the large language model, the plan using the AI models, wherein the AI models ingest data and provide knowledge representations of the data.

18. The device of claim 17, wherein the intent is a multistep plan for a query in the input message and the type of response provided by the large language model is a plan with steps and the steps include a combination of artificial intelligence (AI) models and formulas to generate a reasoning chain for the steps.

19. The device of claim 17, wherein the intent is seeking an answer for a scientific query in the input message and the type of response provided by the large language model is an answer to the scientific query from a grounded dataset with a link identifying a source of the answer.

20. The device of claim 17, wherein the intent is asking a support question and the type of response provided by the large language model is an answer to the support question with information obtained from a user manual or support guide for providing the answer.

\* \* \* \* \*